(No Model.) 6 Sheets—Sheet 1.
A. BRYSON, Jr., J. H. PENDLETON & L. MOSS.
CABLE SHIFTING DEVICE FOR CABLE RAILWAYS.
No. 440,001. Patented Nov. 4, 1890.

Witnesses.
Chas. W. Thomas
John F. Nelson.

Inventors.
Andrew Bryson Jr.
John H. Pendleton
Lincoln Moss.
By Knight Bros
Att'ys (No Model.) 6 Sheets—Sheet 2.

A. BRYSON, Jr., J. H. PENDLETON & L. MOSS.
CABLE SHIFTING DEVICE FOR CABLE RAILWAYS.

No. 440,001. Patented Nov. 4, 1890.

(No Model.) 6 Sheets—Sheet 3.

A. BRYSON, Jr., J. H. PENDLETON & L. MOSS.
CABLE SHIFTING DEVICE FOR CABLE RAILWAYS.

No. 440,001. Patented Nov. 4, 1890.

Witnesses.
Chas. W. Thomas.
John F. Nelson.

Inventors
Andrew Bryson Jr
John H. Pendleton
Lincoln Moss.
By Knight Bros
Att'ys.

(No Model.) 6 Sheets—Sheet 5.

A. BRYSON, Jr., J. H. PENDLETON & L. MOSS.
CABLE SHIFTING DEVICE FOR CABLE RAILWAYS.

No. 440,001. Patented Nov. 4, 1890.

(No Model.) 6 Sheets—Sheet 4.

A. BRYSON, Jr., J. H. PENDLETON & L. MOSS.
CABLE SHIFTING DEVICE FOR CABLE RAILWAYS.

No. 440,001. Patented Nov. 4, 1890.

(No Model.) 6 Sheets—Sheet 6.

A. BRYSON, Jr., J. H. PENDLETON & L. MOSS.
CABLE SHIFTING DEVICE FOR CABLE RAILWAYS.

No. 440,001. Patented Nov. 4, 1890.

UNITED STATES PATENT OFFICE.

ANDREW BRYSON, JR., OF NEW YORK, JOHN H. PENDLETON, OF BROOKLYN, AND LINCOLN MOSS, OF NEW YORK, ASSIGNORS TO THE RAPID TRANSIT CABLE COMPANY, OF NEW YORK, N. Y.

CABLE-SHIFTING DEVICE FOR CABLE RAILWAYS.

SPECIFICATION forming part of Letters Patent No. 440,001, dated November 4, 1890.

Application filed August 22, 1889. Serial No. 321,617. (No model.)

*To all whom it may concern:*

Be it known that we, ANDREW BRYSON, Jr., of New York, county and State of New York, JOHN H. PENDLETON, of Brooklyn, county of Kings, State of New York, and LINCOLN MOSS, of New York, county and State of New York, citizens of the United States, have jointly invented a new and useful Cable-Shifting Device for Cable Railways, of which the following is a specification.

Our invention relates to the class of cable railways or tramways which employ two distinct and independently-operated cables, (which for convenient reference are distinguished as the "primary cable" and the "auxiliary cable,") such as are described in Letters Patent numbered, respectively, 406,301 and 406,302, and in an application for patent whose serial number is 321,616. In said Patents Nos. 406,301 and 406,302 means are provided for shifting the grip from one to the other cable. In our present invention it is the cables themselves which are shifted so as to withdraw one cable from and by the selfsame motion to place the other cable in position to be gripped.

Our improvements are more especially designed for and are here represented in connection with a sub-surface conduit, but are also applicable to elevated and other forms of cable railways employing two cables, as aforesaid.

Our invention is designed to be used with a single grip for each car, and the construction is such that one cable is substituted for the other in the grip without displacement of the grip, without unshipment of either cable from its supporting-sheave, and without detention of the car-travel or of the cable-propulsion.

The word "cord" in this specification is used in its generic sense to mean any suitable flexible tensional instrumentality—such, for example, as a wire cable, a chain, or one or more rods in unison or severally at the constructer's discretion.

Referring to the accompanying drawings, which form a part of this specification, Fig. 6$^a$ shows the sheaves tipped to bring the other cable into position.

1 may represent the concrete floor, and 2 2' the concrete retaining-walls of a cable-conduit.

3 are iron bed-plates embedded in said floor and affording support and attachment for standards 4, to which the various guiding and supporting sheaves are journaled, and which also, being prolonged upward, as at 5, serve to uphold the conduit-roof 6 and one plate 7 of the slot 8, whose other plate 9 is attached to a bracket 10, that rests upon the conduit-wall 2.

11 12 are two independently-driven traction-cables, respectively distinguished as the "principal" cable and the "auxiliary" cable.

13 represents an endless cord or wire cable, by which the cable-shifting apparatus is operated. The said cord 13 will be known in this specification as the "shifting-cord."

In the straight portions of the conduit the two cables 11 12 rest upon pairs of grooved vertical sheaves 14 15, journaled, one a little in advance of the other, in a shiftable gravitating frame 16, upheld on rock-arms 17. The swing of the frame 16 is restricted and the concrete protected from injury by studs 18, attached to the wall 2 2'. The arrangement is such that one or other cable is brought into the effective position directly underneath the slot, according to whether the frame 16 is swung to the right or to the left. Groups of like shiftable sheaves 14 15, similarly journaled in a horizontally-lateral shiftable frame of identical construction with the frame 16, are placed at suitable intervals throughout the straight portions of the conduit.

Figure 1:
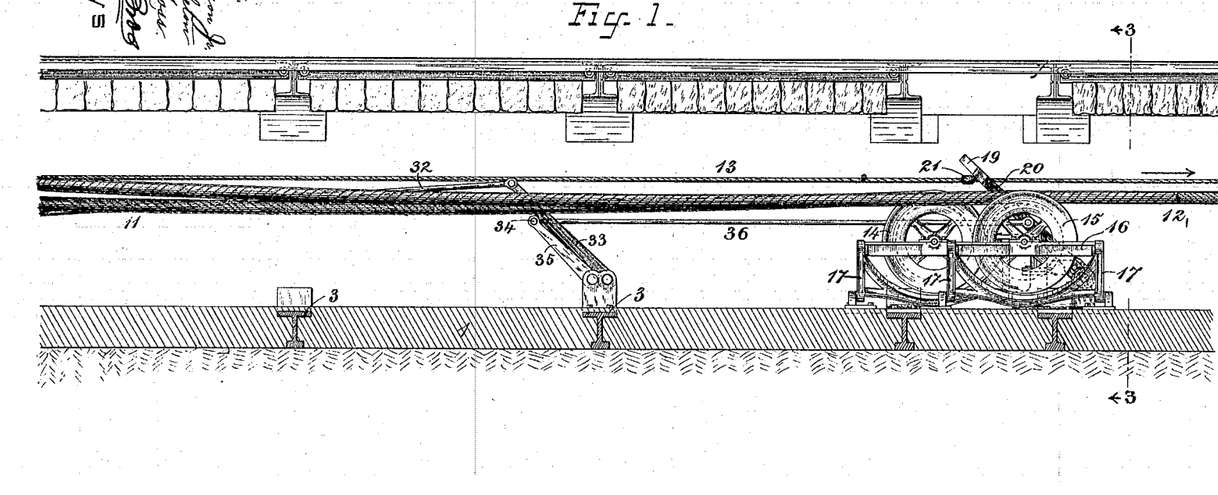
Figure 1 is a longitudinal section of a straight portion of a cable railway near a curve, showing our improvements.
Figure 2:
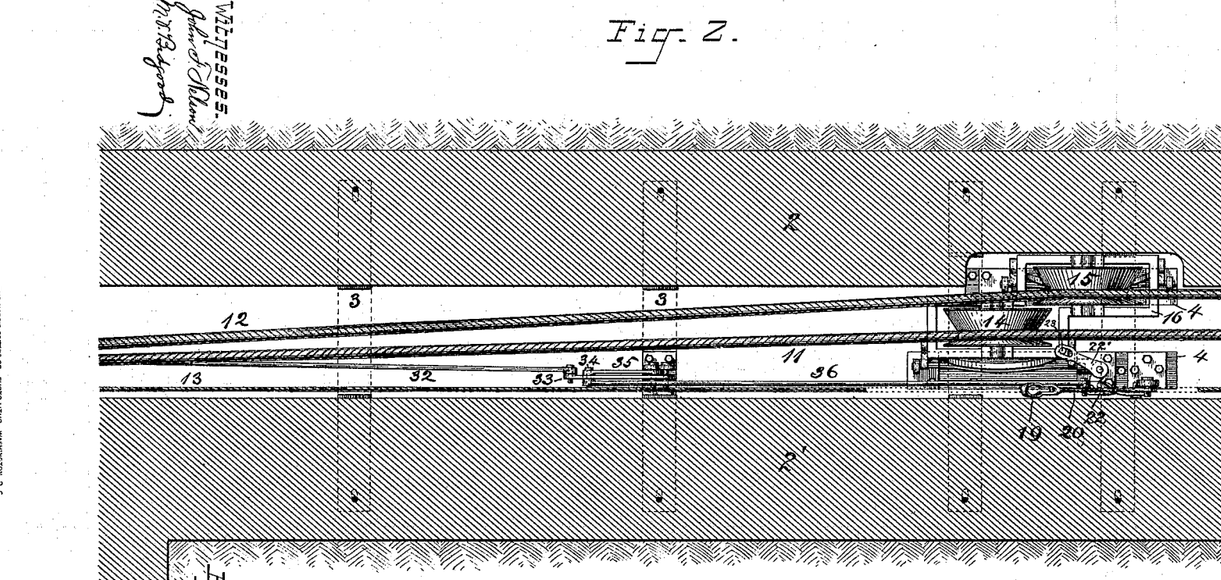
Fig. 2 is a plan of the same.
Figure 3:
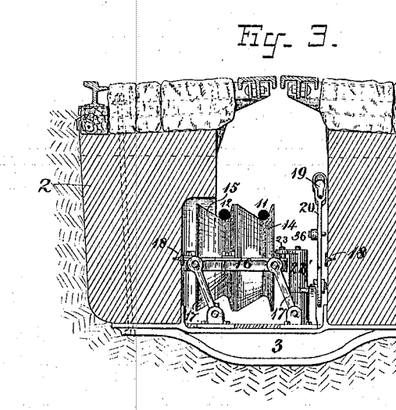
Fig. 3 is a transverse section on the line 3 3, Fig. 1.

Practically simultaneous shift of every frame to right or left, as the case may be, is secured by means of the cord 13, operating through the following mechanism: The cord 13 rests in the narrow lower portion of the key-hole-shaped eye 19 of a lever 20, and is provided with numerous knobs or balls 21, which, until the bars 20 are drawn beyond the vertical by the movement of the cord 13, operate to swing said lever as per arrow in Fig. 1. The lever 20 being connected by link 22 and slotted bell-crank 22' to a stud 23 on the carriage 16, (see Figs. 1, 2, and 3,) it follows that a movement of the lever longitudinal of the conduit results in a shift of the carriage 16 transverse of the conduit. The shape of the eye 19 is such that a continued movement of the cord, after having swung lever 20 in the manner stated, operates to drag the ball 21 through the upper and wider portion of the eye 19, so as to put the apparatus in a condition for a reverse movement, which will restore every group of sheaves throughout the circuit to its original position. The selfsame movement of the cord 13 operates at the same instant to impart a vertically-lateral shift to the parts of the same cables, for the time being inclosed within the curved portions of the conduit by means and in manner now to be explained.

Figure 4:
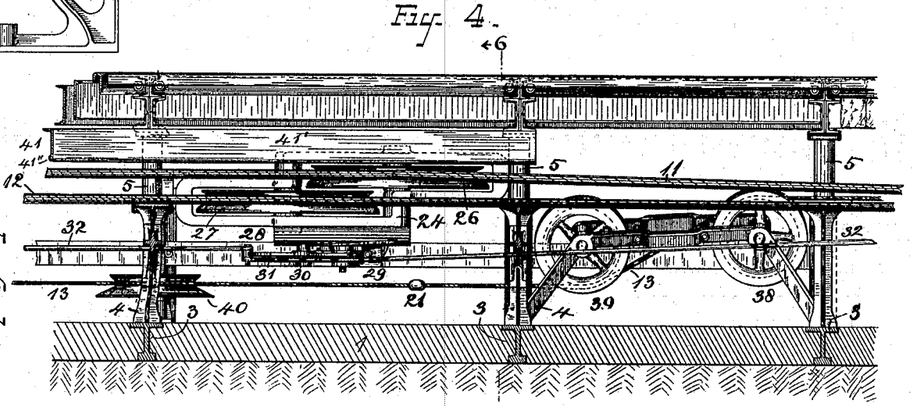
Fig. 4 is a longitudinal section which comprises a part of the straight and a contiguous part of the curved portion of a cable railway employing duplicate (duplex) cables.
Figure 5:
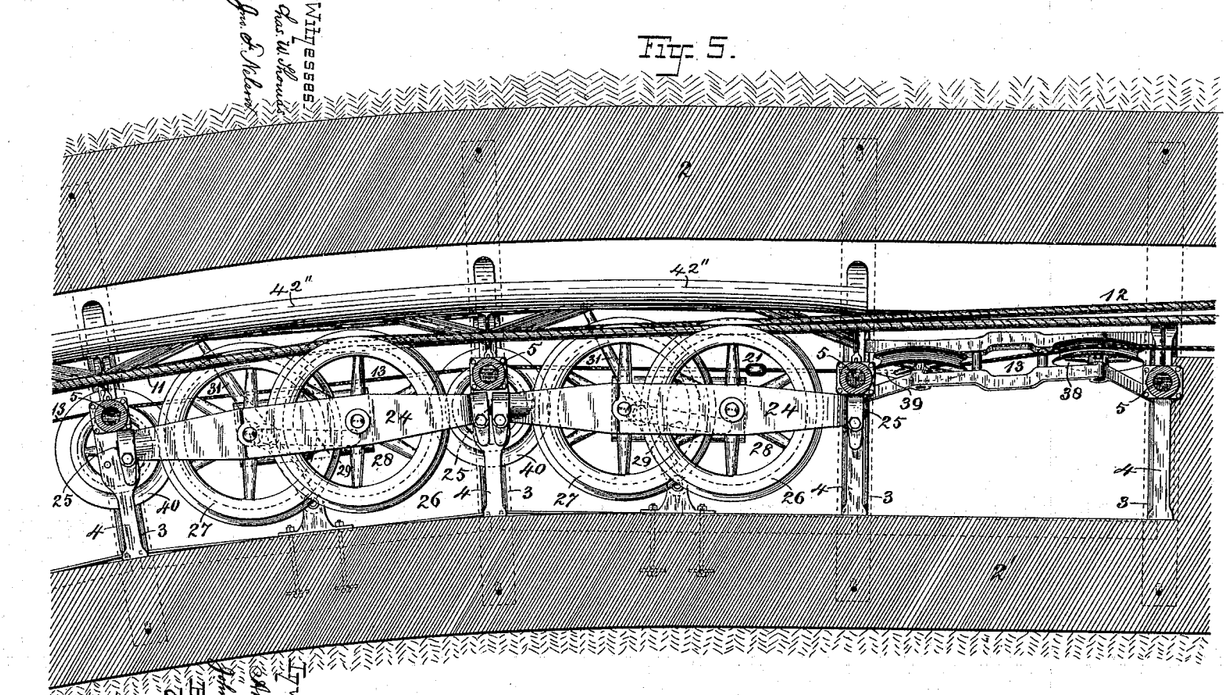
Fig. 5 is a plan view of the same, showing more of the curve.
Figure 6:
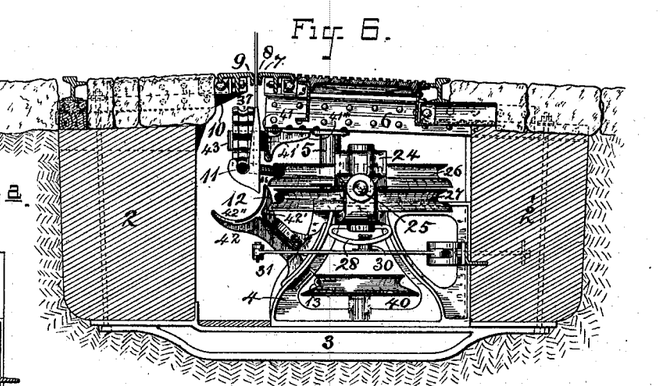
Fig. 6 is a transverse section on the line 6 6, Fig. 4.
Figure 9:
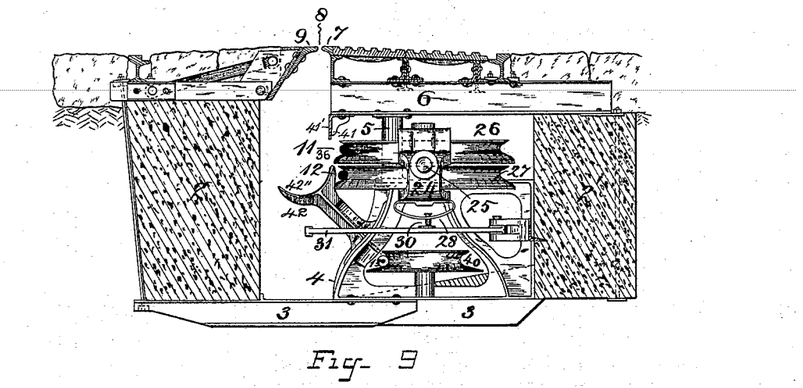
Fig. 9 is a like section of a curved portion of the same.
Figure 12:
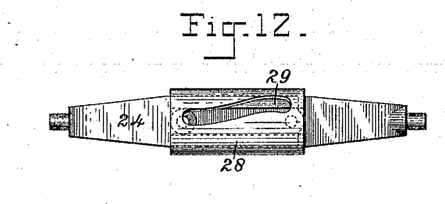
Fig. 12 is an under side view of the tipping frame.

24 is a frame having a pair of horizontal trunnions 25, which are journaled tangential to the conduit-curve in a standard 4. Journaled vertically in frame 24 are two horizontal grooved sheaves 26 27. A keel or projection 28 from the bottom of the frame 24 has an oblique ogee slot 29, which receives a stud 30, (see Figs. 4, 6, and 6ª,) that projects from a lever 31, which is connected by rod 32 to an arm 33, which rests against wrist 34 on a shorter and independently-pivoted arm 35, which is by rod 36 connected to the lever 20, before spoken of. (See Figs. 1, 2, 4, and 5.) The represented ogee form of the slot 29 is effective at its middle portion to tilt the frame in the manner stated, and at its recurved end portions to lock the said tilted frame to a right or left position until forcibly disengaged therefrom in the manner explained. Similar rods 32 connect each lever 31 to the like lever of the next group of horizontal sheaves, and so on throughout the curve, and are connected to a precisely similar lever 20 on the next consecutive straight portion of the conduit, the system of rods 32 36, arms 33 35, and lever 20, by which the tilting mechanism is operated, being placed at each end of the curve and so arranged that continued movements of the shifting-cord in either direction always produces tension in the rods 32 and effects the tilting. The act of tipping the pair of horizontal sheaves 26 27 operates to bring one or other cable opposite a slot 86, which continues all around the curve, and through which, at the instant of passage of the grip 37, it passes, as seen in Fig. 6. At all other times both cables lie prone in the troughs of the sheave-grooves, as seen in Figs. 4, 5, and 9.

38 39 are sheaves which, at each entrance to the curved parts of the conduit, conduct the cord 13 to a series or horizontal sheaves 40 near the floor of the conduit, which prevent the entanglement of the cord with the tipping mechanism of the horizontal sheaves. (See Figs. 4 and 6.)

Figure 6A:
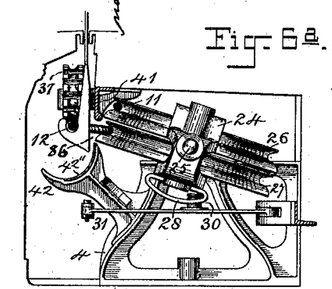

The slot 86, already spoken of, is formed by the upper and the lower guards 41 42, whose distance from one another and from the for-the-time-being working-sheaves are such as to prevent the for-the-time-being working-cable, after passage of the grip, from slipping either above or below its appropriate sheave. The guard 41 is a pendent projection from the conduit-roof 6. Its vertical wall 41' does duty as a track or guide for the horizontal guide-roller 43 on the grip-shank. A stout bead 41'' at its lower edge and a series of knees 41''' enables said guard to withstand the lashing action of the cable. (See Figs. 4 and 6.) The guard 42 is, with a similar object, strongly supported by a ribbed bracket 42', by which it is attached to the post 4. Said guard 42 carries a concave steel plate 42'', which extends throughout the curve, and which constitutes the lower edge of the slot 86, and is so formed and placed as to completely fence in the for-the-time-being inactive auxiliary cable, and so as also to present a trough to receive and support any sag which might happen to the working-cable in passing around the curves. In the other position of the sheaves 26 27 (see Fig. 6ª) the guard 41 in like manner becomes effective to fence in the now inactive principal cable.

Figures 7, 10, 11:
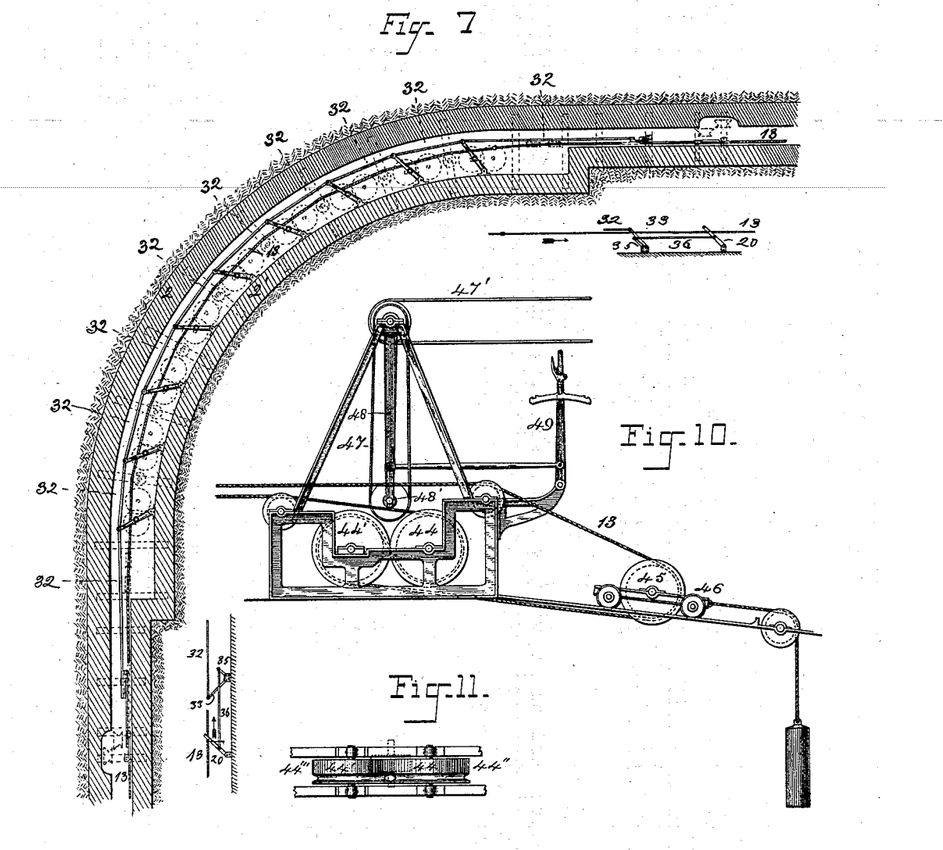
Fig. 7 shows in plan two straight portions of cable railway connected by a curved portion.
Fig. 10 is a side view of the driving and tension mechanism of the shifting-cord.
Fig. 11 is a plan of the driving-pulley thereof.
Figure 8:
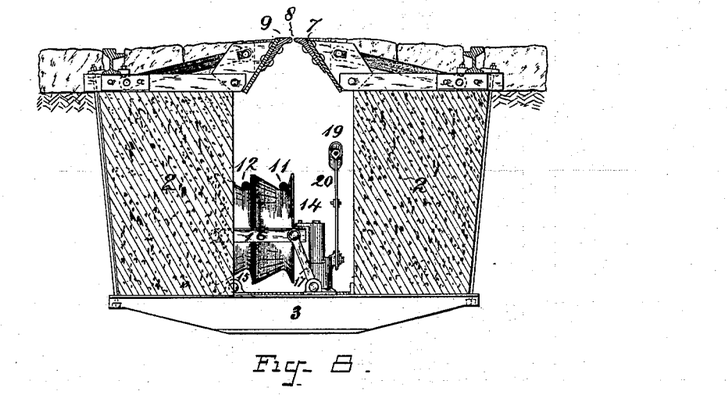
Fig. 8 represents a modification of the conduit by transverse section of a straight portion thereof.

Motion may be given to the shifting-cord by the following means: The cord is rove, in the manner shown in Fig. 10, around two pulleys 44 44' and its bight engaged around an idler 45, mounted in a gravitating carriage 46. Each of the pulleys 44 44' is prolonged on one side of its periphery to form friction-drums 44'' 44''' to take the contact of a driving friction-belt 47 in a swinging frame 48. 49 is a lever connected with the swinging frame 48. This lever (when in its normal vertical position) holds the friction-belt away from both pulleys and no motion is imparted to the cord. Shifting the lever to the right or to the left brings it in contact with one or other pulley with the effect of moving the cable either in one or the other direction. As the sheave-shifting mechanism is only in occasional use, all the members shown in Fig. 10 may be normally at rest, the driving-band 47' being set in motion when necessary by ordinary connection with fast and loose pulleys or other suitable means.

The above-described form of our improvements may be modified in some of its details. For example, a friction pulley or drum on the shaft 48' may be employed, the band 47 then not itself impinging upon the drums 44 44'.

While designed chiefly for and here described in connection with a sub-surface conduit, our improvements are applicable to other forms of railway, such as elevated railways, tunnel-railways, &c.

The improvements in the conduit are described and specifically set forth in an application of even date, whose serial number is 321,616.

Having thus described our invention, the following is what we claim as new therein and desire to secure by Letters Patent—

1. In a curved portion of a cable railway having two independently-operated cables and a grip which travels at a fixed level, the gang of horizontal supporting-sheaves at different levels (one sheave to each cable) for carrying and guiding the respective cables around the curves, said sheaves being adapted to be simultaneously elevated or depressed to conform to the plane of the for-the-time-being traveling cable and the track of the grip, substantially as set forth.

2. In a duplex-cable system of cable railway employing curves, the combination, with vertical supporting-sheaves for carrying the respective cables in straight lines, of the gang of horizontal supporting-sheaves for carrying the cables around the curves adjustable to a higher or lower position, so as to bring the sheave of the for-the-time-being operative cable in effective coaction with the grip, in the manner explained.

3. In a cable railway employing two independently-operated cables, a pair (or series of pairs) of supporting-sheaves (one sheave for each cable) journaled in a frame supported on trunnions and capable of being tilted laterally of the cables, so as to shift both cables simultaneously one from and the other to the effective gripping position, in the manner set forth.

4. In the straight portion of a duplex-cable system of cable railways, a pair of supporting and laterally-shiftable vertical sheaves 14 15, in which the respective cables permanently rest, laterally-shiftable frame 16, in which said sheaves are journaled, and an operating-cord 13, suitably connected to said frame, whereby the operator is enabled to shift one cable from the operative to an inoperative position and to simultaneously bring the second cable into position for gripping without stopping the car or cable or displacing the grip.

5. In the straight portion of a duplex cable system of cable railways, the combination of the two cables with a laterally-adjustable gang of vertical supporting-sheaves 14 15, journaled in a right and left gravitating, rocking, or tiltable frame, together with operating-cords, &c., for tilting said frame, whereby one sheave is thrust into and the other away from the operative position.

6. In the straight portion of a duplex-cable system of cable railways, vertical supporting-sheaves 14 15, journaled in pairs in gravitating rocking frames, and means, substantially as shown and described, for shifting the frames laterally, in combination with stops which limit the swing or rock of the said frames, substantially as set forth.

7. In a cable railway employing two or more cables, the combination of the paired vertical supporting-sheaves 14 15, journaled in laterally-rocked frame 16, with operating-cord 13 and connecting mechanism for simultaneously shifting and locking the respective cable-sheaves to and from the operative positions of their respective cables, in the manner set forth.

8. In a cable railway employing two or more cables, the combination of the supporting-sheaves and a traveling shifting-cord which successively shifts the sheaves and the supported cables, substantially as and for the purposes set forth.

9. In a duplex-cable system of cable railways, the combination of the duplicate cables, corresponding duplicate sheaves, and a traveling shifting-cord connected to the sheaves in such a manner that as it moves along it will shift one cable and its set of supporting-sheaves into and the other cable and its supporting-sheaves away from the normal operative position.

10. In a duplex-cable system of cable railways, the combination of the duplicate cables and their supporting-sheaves, said sheaves being arranged in pairs and mounted in frames, with a traveling shifting-cord connected to the frames and adapted as it travels along to throw one cable out of and the other cable into operative position.

11. In a duplex-cable system of cable railways, the combination of the duplicate cables, two series of supporting-sheaves mounted as pairs in frames, a series of vertical levers having openings or eyes at their upper ends, and a traveling shifting-cord provided with a ball or projection extending through the said eyes or openings and adapted when it moves along to throw the levers and shift the frames and the superincumbent sheaves and cables from side to side, as and for the purposes set forth.

12. In a duplex system of cable railways, the combination of the duplicate cables, vertical supporting-sheaves, frames for carrying the sheaves, and a traveling cord connected to the frames and so constructed and arranged as that when the said cord is made to travel forward it will shift both cables with their supporting-sheaves in one lateral direction and when made to travel backward it will reverse the operation, substantially as set forth.

13. In a duplex system of cable railways, the combination of the duplicate cables, the vertical carrying-sheaves, the supporting-frames provided with rock-arms, and a traveling cord for shifting the frames, all the parts being so constructed and arranged as that when the shifting-cord is operated the frames will be swung laterally and will drop by gravity in either of the extreme positions.

14. In the curved portions of a cable railway, the combination, with two independently-propelled cables, of as many horizontal cable-carrying sheaves journaled in a tiltable frame under control of the operator for simultaneous vertical shift of both cables, one to and the other from the operative position without unshipping either cable from its sheaves, displacing the grip, or arresting the travel of car or cable.

15. In a duplex-cable system of cable railways employing curves, the combination of a series of horizontal guiding-sheaves 26 27, journaled one above the other in pairs in a tiltable frame 24, having the ogee slot 29, the frame-tipping stud 30, the levers 20 31, the arms 33 35, and the rods 32 36, whereby all of said sheaves may be simultaneously tilted and locked to the extreme up or down position simultaneously with the horizontal shift of the straight positions of the cables, as set forth.

16. In a duplex-cable system of cable railways employing curved tracks, the combination of a series of horizontal supporting and guiding sheaves 26 27, located on the inner side of such curve, the sheaves being arranged one above the other in pairs and each sheave supporting laterally and guiding one of the respective cables, both sheaves being journaled in a tilting frame 24, with means, substantially as shown and described, for tilting said frame, whereby one of the cables will be withdrawn from and the other thrust into the operative position, in the manner explained.

17. In a duplex-cable system of cable railways employing curves, the combination of the duplicate cables, and a series of duplicate sheaves arranged in pairs one above the other and mounted in frames, substantially as shown and described, said frames being connected to each other by connecting-rods in such a manner that all the frames can be tilted simultaneously and the respective cables be shifted into and out of operative position, substantially as set forth.

18. In a duplex-cable system of cable railways, the combination of the duplicate cables, a series of vertical supporting-sheaves grouped in pairs for carrying the cables on straight lines, and a series of horizontal supporting-sheaves grouped in pairs for carrying and guiding the cables around the curves, said horizontal and vertical sheaves being mounted in pivoted frames and connected throughout the length of the track, substantially as shown and described, whereby the entire series of frames, with their carrying-sheaves, may be simultaneously shifted and one cable withdrawn from and the other brought into operative position.

19. In a duplex-cable system of cable railways employing curves, the combination of the shiftable vertical supporting-sheaves for carrying the cables on straight lines, the tiltable horizontal supporting-sheaves for carrying the cable around the curve, and means, substantially as shown and described, for shifting both the vertical and the horizontal groups of pulleys, whereby one cable can be withdrawn from and the other thrust into operative position throughout both the curved and the straight portions through the instrumentality of a single cord, in the manner set forth.

20. In a cable railway having two independently-operated cables, the combination, with an operating or shifting cord 13 and suitable transmitting mechanism, of the laterally-shiftable frame 16, having the pair of vertical bearing-sheaves 14 15, for the purposes set forth.

21. In a curved portion of a cable railway having two independently-operated cables, the combination, with an operating or shifting cord 13 and suitable transmitting mechanism, of a series of standards 4, which each carry a tipping frame 24, that bears a pair of horizontal bearing-sheaves 26 27, for the purposes set forth.

22. In a cable railway having two independently-operated cables and a track or tracks that comprise both straight and curved portions, the combination, with an operating or shifting cord 13, and with suitable transmitting mechanism, of the pairs of laterally-shiftable vertical bearing-sheaves in the straight portions, and the pairs of vertically-tipping horizontal bearing-sheaves in the curved portions, substantially as set forth.

23. In a cable railway having two independently-operated cables, the combination, with the pairs of vertical bearing-sheaves 14 15 in laterally-shiftable frame 16, and with an operating-cord 13, having balls 21, of the levers 20, having the key-hole-shaped eyes 19, and being connected to said shiftable frame by links 22 and slotted bell-crank 22′, as set forth.

24. In a cable railway having two independently-operated cables, the combination, with the pairs of horizontal bearing-sheaves 26 27 in the vertically-tipped frame 24 of the curved portions, and with transmitting mechanism from the operating-levers 20 in the straight portions, of the upper and the lower guards 41 42, constructed and operating as set forth.

25. In the curved portion of a cable railway having two independently-operated cables, the combination, with the pair of vertically-tipped horizontal bearing-sheaves 26 27, of the combined upper guard and grip track or guide 41, as set forth.

26. In the curved portion of a cable railway having a two independently-operated cables and pair of shiftable horizontal bearing-sheaves 26 27, the combined lower guard and slack-support 42, as set forth.

27. In combination with the horizontal bearing-sheaves 26 27, the slot 36, formed by the upper guard 41 and the lower guard 42, as set forth.

28. In the described combination with the endless shifting-cord 13, the pair of pulleys 44 44', the swinging friction-belt 47, arranged intermediate of said pulleys and normally out of contact therewith, and an operating-handle 49, substantially as set forth.

29. The described combination of endless shifting-cord 13, the pair of grooved pulleys 44 44', having their peripheries prolonged on one side to form friction-drums 44 44''', the idler 45 in the bight of the cord 13 on a gravitating carriage 46, the friction-belt 41 on a swinging frame 48, so hung as to be normally out of contact with both pulleys, and the operating-lever 49, substantially as set forth.

30. The combination, with the stud 30 on the lever 31, of the obliquely-slotted cam or keel 28 on the tipping frame 24 of the pair of horizontal bearing-sheaves 26 27, as set forth.

31. In the curved portion of a cable railway having duplicate cables, a series of horizontal cable-supporting sheaves grouped in pairs, a tipping frame supporting each pair having an oblique ogee shifting and rocking slot or cam, and a lever having a stud that occupies said slot and operates to tilt said frame and having suitable connection with the shifting-cord 13, coextensive with the track, as set forth.

32. The combination, with the sheave-operating lever 20, having the key-hole-shaped eye 19, of the shifting-cable 13, having the balls 21, which, after having reversed said lever and thus shifted the cable-bearing sheaves, escape through the wider upper portion of said eye, as and for the purposes set forth.

33. The transmitting mechanism between the lever 20 and the tipping frame 24, consisting of the combination of rod 32, connected to long arm 33, and the independently-pivoted short arm 35, whose wrist 34 engages behind the arm 33 and is connected by rod 36 to the said lever 20 in the manner explained.

34. In a duplex-cable system for cable railways, the combination, with pairs of shiftable supporting-sheaves, of the endless operating-cord 13, the respectively right and left normally inactive driving-pulleys 44 44', the tightening-sheave 45 in the bight of the cord, the friction-band 47 in the swinging frame 48, and the operating-lever 49, substantially as and for the purposes set forth.

35. In a duplex-cable system employing vertical and horizontal sheave groups in the straight and curved portions, respectively, the means, substantially as shown and described, for simultaneous shift of both groups into relation with a given cable by the instrumentality of a single knotted cord 13, said means consisting of the following elements, to wit: a group (or series of groups) of vertical supporting-sheaves 14 15 in the straight portion, said sheaves being journaled one a little in advance of the other, a shiftable gravitating bearing 16 therefor, rock-arms 17, which uphold said bearing, bell-crank 22', and link 22, connected to slotted lever 20, and combined with the above a group (or series of groups) of horizontal sheaves 26 27 in the curved portion, obliquely-slotted tiltable bearing 24 therefor, the stud or bearing-tilter 30, lever 31, arms 33 35, rods 32 36, that connect to the same lever 20, and the single knotted cord 13, which (through said lever 20) operates simultaneously on both sets of sheave groups.

ANDREW BRYSON, JR.
JOHN H. PENDLETON.
LINCOLN MOSS.

Witnesses:
HARRY E. KNIGHT,
GEO. H. KNIGHT, Jr.